(12) United States Patent
Hunyadi Murph et al.

(10) Patent No.: US 11,307,129 B2
(45) Date of Patent: Apr. 19, 2022

(54) AUTOMATIC GAS SORPTION APPARATUS AND METHOD

(71) Applicant: SAVANNAH RIVER NUCLEAR SOLUTIONS, LLC, Aiken, SC (US)

(72) Inventors: Simona E. Hunyadi Murph, North Augusta, SC (US); Henry T. Sessions, Aiken, SC (US); Michael A. Brown, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 182 days.

(21) Appl. No.: 16/826,789

(22) Filed: Mar. 23, 2020

(65) Prior Publication Data

US 2021/0293689 A1    Sep. 23, 2021

(51) Int. Cl.
| | |
|---|---|
| *G01N 7/00* | (2006.01) |
| *G01N 15/08* | (2006.01) |
| *G01N 30/00* | (2006.01) |
| *G01N 33/20* | (2019.01) |

(52) U.S. Cl.
CPC . *G01N 15/0806* (2013.01); *G01N 2015/0866* (2013.01)

(58) Field of Classification Search
CPC .............. G01N 7/00–18; G01N 15/08; G01N 15/0806; G01N 30/00; G01N 33/00; G01N 33/20; G01N 2015/0866
See application file for complete search history.

(56) References Cited

U.S. PATENT DOCUMENTS

| | | | |
|---|---|---|---|
| 2,446,997 | A | 8/1948 | Brewer et al. |
| 2,586,717 | A | 2/1952 | Robinson |
| 2,692,497 | A | 10/1954 | Van Nordstrand |
| 2,863,526 | A | 12/1958 | Salmon |
| 3,004,628 | A | 10/1961 | Hunt et al. |
| 3,101,256 | A | 8/1963 | Holmberg |
| 3,707,870 | A | 1/1973 | Herve et al. |
| 3,904,500 | A | 9/1975 | Jensen |

(Continued)

FOREIGN PATENT DOCUMENTS

| | | |
|---|---|---|
| CN | 1251323 | 4/2000 |
| CN | 101858842 | 10/2010 |

(Continued)

OTHER PUBLICATIONS

Aditya, et al. "Nitroarene reduction: a trusted model reaction to test nanoparticle catalysts" *Chem. Comm.* 51 (2015) pp. 9410-9431.

(Continued)

*Primary Examiner* — Nguyen Q. Ha
(74) *Attorney, Agent, or Firm* — Dority & Manning, P.A.

(57) ABSTRACT

Automated apparatuses for use in examining gas sorption materials are described. Devices utilize a noncontact magnetic induction heating approach for controlling the temperature of tested materials. The apparatuses can be used to generate single or multiple isotherms simultaneously. The apparatuses can examine nanogram or microgram-scale quantities of materials of interest and can do so automatically and unattended. Pressure-composition isotherms can be provided through use of disclosed apparatuses in a period of a few hours.

20 Claims, 3 Drawing Sheets

(56) References Cited

U.S. PATENT DOCUMENTS

| | | | |
|---|---|---|---|
| 4,020,350 | A | 4/1977 | Ducas |
| 4,049,515 | A | 9/1977 | Robinson et al. |
| 4,082,633 | A | 4/1978 | Eerkens |
| 4,213,836 | A | 7/1980 | Freund et al. |
| 4,334,883 | A | 6/1982 | Robinson et al. |
| 4,353,871 | A | 10/1982 | Bartlit et al. |
| 4,481,091 | A | 11/1984 | Brus et al. |
| 4,566,326 | A | 1/1986 | Lowell |
| 4,690,742 | A | 9/1987 | Cantrell et al. |
| 4,762,010 | A | 8/1988 | Borghard et al. |
| 5,011,584 | A | 4/1991 | Godfried |
| 5,133,219 | A | 7/1992 | Camp |
| 5,312,597 | A | 5/1994 | Heung |
| 5,436,165 | A | 7/1995 | Brenner |
| 5,895,841 | A | 4/1999 | Lowell |
| 7,288,134 | B2 | 10/2007 | Sun et al. |
| 7,850,918 | B2 | 12/2010 | Gross |
| 8,020,426 | B2 | 9/2011 | Gross |
| 8,247,025 | B2 | 8/2012 | Lee |
| 8,251,885 | B2 | 8/2012 | Ueda et al. |
| 8,470,073 | B2 | 6/2013 | Heung et al. |
| 8,629,401 | B2 | 1/2014 | Kaskel et al. |
| 8,636,906 | B2 | 1/2014 | Stein |
| 8,691,590 | B2 | 4/2014 | Shen et al. |
| 8,784,895 | B2 | 7/2014 | Messersmith et al. |
| 8,822,030 | B2 | 9/2014 | Madden |
| 9,017,713 | B2 | 4/2015 | Tishin et al. |
| 9,034,174 | B2 | 5/2015 | Cheng |
| 9,139,433 | B2 | 9/2015 | Addiego et al. |
| 9,469,555 | B2 | 10/2016 | Predescu et al. |
| 9,522,289 | B2 | 12/2016 | Almutairi et al. |
| 9,738,529 | B2 | 8/2017 | Huber et al. |
| 10,016,745 | B2 | 7/2018 | Murph et al. |
| 2005/0163703 | A1 | 7/2005 | Sugiyama et al. |
| 2007/0164250 | A1 | 7/2007 | Hamad-Schifferli et al. |
| 2008/0085221 | A1* | 4/2008 | Downs ............... G01N 7/04 422/400 |
| 2008/0245430 | A1 | 10/2008 | Adleman et al. |
| 2008/0307960 | A1 | 12/2008 | Hendrickson et al. |
| 2009/0041629 | A1 | 2/2009 | Gross |
| 2013/0122396 | A1 | 5/2013 | Linic et al. |
| 2015/0217222 | A1 | 8/2015 | Hedin et al. |
| 2015/0231269 | A1 | 8/2015 | Kaittanis et al. |
| 2016/0038610 | A1 | 2/2016 | Trabolsi et al. |
| 2016/0151493 | A1 | 6/2016 | Pyayt |
| 2016/0160364 | A1 | 6/2016 | Juluri et al. |
| 2016/0243523 | A1 | 8/2016 | Saini et al. |
| 2017/0175276 | A1 | 6/2017 | Zheng et al. |
| 2018/0056240 | A1 | 3/2018 | Xiao et al. |
| 2018/0080064 | A1 | 3/2018 | Lee et al. |
| 2018/0178571 | A1 | 6/2018 | Zhu et al. |

FOREIGN PATENT DOCUMENTS

| | | | |
|---|---|---|---|
| CN | 102350312 | 2/2012 | |
| CN | 102436886 | 5/2012 | |
| CN | 102500297 | 6/2012 | |
| CN | 103134932 | 6/2013 | |
| CN | 103240120 | 8/2013 | |
| CN | 103285410 | 9/2013 | |
| CN | 103439474 | 12/2013 | |
| CN | 103185796 | 5/2015 | |
| JP | H 07289853 | 11/1995 | |
| KR | 20050106877 | 11/2005 | |
| KR | 20070113584 | 11/2007 | |
| WO | WO-02075305 A1 * | 9/2002 | ........... H01F 1/0573 |

OTHER PUBLICATIONS

Afkhami, et al. "Adsorptive removal of Congo red, a carcinogenic textile dye, from aqueous solutions by maghemite nanoparticles" *J. Hazar. Mater.* 174 (2010) pp. 398-403.

Baffou, et al. "Photoinduced Heating of Nanoparticle Arrays" *ACS Nano* 7 (2013) pp. 6478-6488.

Baffou, et al. "Heat generation in plasmonic nanostructures: Influence of morphology" *Appl. Phys. Lett.* 94:153109 (2009) pp. 1-3.

Bao, et al. "Synthesis of Magnetic $Fe_2O_3$/Au Core/Shell Nanoparticles for Bioseparation and Immunoassay Based on Surface-Enhanced Raman Spectroscopy" *Langmuir* 25 (2009) pp. 10782-10787.

Baumert, et al. "Synthesis and Characterization of Novel Nanothermometers" *Augusta U.* (2016) p. 1. (Abstract only).

Blaser, H. "A Golden Boost to an Old Reaction" *Science* 313 (2006) pp. 312-313.

Cao, et al. "In situ growth of Au nanoparticles on $Fe_2O_3$ nanocrystals for catalytic applications" *CrystEngComm* 14 (2012) pp. 7229-7235.

Carbone, et al. "Colloidal Heterostructured Nanocrystals: Synthesis and Growth Mechanisms" *Nano Today* 5 (2010) pp. 449-493.

Chen, et al. "$Fe_2O_3$@Au Core@Shell Nanoparticle-Graphene Nanocomposites as Theranostic Agents for Bioimaging and Chemo-Photothermal Synergistic Therapy" *RSC Adv.* (2015) pp. 1-3.

Coral, et al. "Effect of Nanoclustering and Dipolar Interactions in Heat Generation for Magnetic Hyperthermia" *Langmuir* 32 (2016) pp. 1201-1213.

Corma, et al. "Chemoselective hydrogenation of nitro compounds with supported gold catalysts" *Science* 313 (2006) pp. 332-334.

Daniells, et al. "The mechamsm of low-temperature CO oxidation with Au/$Fe_2O_3$ catalysts: a combined Mossbauer, FT-IR and TAP reactor study" *J. Cataly.* 230 (2005) pp. 52-65.

De Jongh, et al. "Nanosizing and nanoconfinement: new strategies towards meeting hydrogen storage goals" *Chem. Sus. Chem.* 3 (2010) pp. 1332-1348.

Eggers, et al. "A second view on the possible enhancement of distillation efficiency with nanofluids" *Appl. Therm. Eng.* 125 (2017) pp. 29-34.

Fang, et al. "Hierarchical bi-dimensional alumina/palladium nanowire nano-architectures for hydrogen detection, storage and controlled release" *Int'l. J. Hydro. Ener.* 40 (2015) pp. 6165-6172.

Fang, et al. "Monodisperse α-$Fe_2O_3$@$SiO_2$@Au core/shell nanocomposite spheres: synthesis, characterization and properties" *Nanotech.* 19:125601 (2008) pp. 1-7.

Gao, et al. "Bifunctional combined Au—$Fe_2O_3$ nanoparticles for induction of cancer cell-specific apoptosis and real-time imaging" *Biomater.* 33 (2012) pp. 3710-3718.

Griessen, et al. "Thermodynamics of the Hybrid Interaction of Hydrogen with Palladium Nanoparticles" *Nat. Mater.* 15 (2016) pp. 311-317.

Haruta, M. "Gold as a novel catalyst in the 21$^{st}$ century: Preparation, working mechanism and applications" *Gold Bull.* 37 (2004) pp. 27-36.

Haruta, M. "Catalysis of gold nanoparticles deposited on metal oxides" *CATTECH* 6 (2002) pp. 102-115.

Hervés, et al. "Catalysis by metallic nanoparticles in aqueous solution: model reactions" *Chem. Soc. Rev.* 41 (2012) pp. 5577-5587.

Jabeen, et al. "Au-Nanomaterials as a Superior Choice for Near-Infrared Photothermal Therapy" *Molecules* 19 (2014) pp. 20580-20593.

Jaque, et al. "Nanoparticles for photothermal therapies" *Nanoscale* 6 (2014) pp. 9494-9530.

Jiang, et al. "Size-Dependent Photothermal Conversion Efficiencies of Plasmonically Heated Gold Nanoparticles" *J. Phys. Chem. C* 117 (2013) pp. 27073-27080.

Keblinski, et al. "Limits of Localized Heating by Electromagnetically Excited Nanoparticles" *J. Appl. Phys.* 100:054305 (2006) pp. 1-5.

Konda, et al. "Palladium Based Nanomaterials for Enhanced Hydrogen Spillover and Storage" *Mater. Today* 19 (2016) pp. 100-108.

Larsen, et al. "Multifunctional $Fe_2O_3$—Au Nanoparticles with Different Shapes: Enhanced Catalysis, Photothermal Effects, and Magnetic Recyclability" *J. Phys. Chem. C* 120 (2016) pp. 15162-15172.

Larsen, et al. "Porous Iron Oxide Nanorods and Their Photothermal Applications" *Nanophot. Mater. XIII* 9919 (2016) pp. 1-8.

(56) References Cited

OTHER PUBLICATIONS

Larsen, et al. "Hybrid $Fe_2O_3$—Au Nanoparticles: Synthesis and Photothermal Properties" *Adv. Mater. Tech. Briefs* (2015) pp. 219-222.

Laurent, et al. "Magnetic Fluid Hyperthermia: Focus on Superparamagnetic Iron Oxide Nanoparticles" *Adv. Coll. Interf. Sci.* 166 (2011) pp. 8-23.

Li, et al. "$Fe_2O_3$@Au core/shell nanoparticle-based electrochemical DNA biosensor for *Escherichia coli* detection" *Talanta* 84 (2011) pp. 607-613.

Linic, et al. "Plasmonic-metal nanostructures for efficient conversion of solar to chemical energy" *Nat. Mater.* 10 (2011) pp. 911-921.

Liu, et al. "Laser heating of metallic nanoparticles for photothermal ablation applications" *AIP Adv.* 7:025308 (2017) pp. 1-12.

Lyon, et al. "Synthesis of Fe oxide core/Au shell nanoparticles by iterative hydroxylamine seeding" *Nano Lett.* 4 (2004) pp. 719-723.

Micrometrics. "ASAP® 2420 Multi-Port Surface Area and Porosimetry Analyzer" *Micromeritics Instr. Corp.* (2017) pp. 1-2.

Micrometrics. "AutoChem II 2920 Automated Catalyst Characterization System" *Micromeritics Instr. Corp.* (2017) pp. 1-6.

Micrometrics. "Chemisorption" *Micromeritics Instr. Corp.* (2017) p. 1.

Murph, et al. "Multifunctional Hybrid $Fe_2O_3$—Au Nanoparticles for Efficient Plasmonic Heating" *J. Visual Exper.* 108:e53598 (2016) pp. 1-8.

Neumann, et al. "Nanoparticle-mediated, Light-induced Phase Separations" *Nano Lett.* 15 (2015) pp. 7880-7885.

Nguyet, et al. "Preparation of Gold Nanoparticles, $Au/Fe_2O_3$ by Using a Co-Precipitation Method and their Catalytic Activity" *J. Kor. Phys. Soc.* 52 (2008) pp. 1345-1349.

Park, et al. "Fabrication of magnetic core @ shell Fe oxide @ Au nanoparticles for interfacial bioactivity and bio-separation" *Langmuir* 23 (2007) pp. 9050-9056.

Sanchot, et al. "Plasmonic Nanoparticle Networks for Light and Heat Concentration" *ACS Nano* 6 (2012) pp. 3434-3440.

Schneemann, et al. "Nanostructured metal hydrides for hydrogen storage" *Chem. Rev.* 118 (2018) pp. 10775-10839.

Shevchenko, et al. "Gold/Iron Oxide Core/Hollow-Shell Nanoparticles" *Adv. Mater.* 20 (2008) pp. 4323-4329.

Sotiriou, et al. Photothermal Killing of Cancer Cells by the Controlled Plasmonic Coupling of Silica-Coated $Au/Fe_2O_3$ Nanoaggregates *Adv. Funct. Mater.* (2014) pp. 1-10.

Sun, et al. "Recognition and transmembrane delivery of bioconjugated $Fe_2O_3$@Au nanoparticles with living cells" *Nanoscale* 2 (2010) pp. 269-276.

Sunandana, C.S. "Nanomaterials for hydrogen storage" *Resonance* 12 (2007) pp. 31-36.

Wang, et al. "Shape and size controlled alpha-$Fe_2O_3$ nanoparticles as supports for gold-catalysts; Synthesis and influence of support shape and size on catalytic performance" *Appl. Cataly. A* 364 (2009) pp. 42-47.

Wang, et al. "Core@shell nanomaterials: gold-coated magnetic oxide nanoparticles" *J. Mater. Chem.* 18 (2008) pp. 2629-2635.

Yao, et al. "$Fe_2O_3/TiO_2$ Core-Shell Nanorod Array for Visible Light Photocatalysis" *Cataly. Today* 270 (2016) pp. 51-58.

Zhang, et al. "Engineering Inorganic Hybrid Nanoparticles: Tuning Combination Fashions of Gold, Platinum and Iron Oxide" *Langmuir* 24 (2008) pp. 13197-13202.

\* cited by examiner

AUTOMATIC GAS SORPTION APPARATUS AND METHOD

This invention was made with Government support under Contract No. DE-AC09-08SR22470, awarded by the United States Department of Energy. The Government has certain rights in the invention.

BACKGROUND

Hydrogen is of increasing interest as a clean fuel for fuel cells, pumping and compression systems, absorption coolers, etc. Unfortunately, the existence of safe and efficient hydrogen storage still remains a major drawback to more widespread adoption of hydrogen as a fuel. Hydrogen has conventionally been stored either in the gas phase under high pressure or in the liquid phase at extremely low temperatures, both of which require expensive processing and storage facilities.

Solid-state storage systems are being developed as a more acceptable approach to hydrogen storage. Development of improved solid state hydrogen storage materials that can efficiently and reversibly store hydrogen is of particular interest in development of devices that can employ a controlled absorption/desorption mechanism, particularly those desirous of a large hydrogen-storage capacity for use as a fuel. Development of improved solid state hydrogen absorption/desorption materials is also of interest in separations technologies, both in separation of gases of different types from one another, e.g., separation of hydrogen from other gases, and in separation of different isotopes of the same material from one another, e.g., separation of protium, deuterium, and tritium.

Hydrogen storage in a solid phase presents fewer safety problems than gas or liquid phase hydrogen storage, particularly when desorption can be well controlled. Moreover, storage of hydrogen in a solid phase, for instance in the interstitial hydride form, can provide a greater volumetric storage density than storage as a compressed gas or a liquid. Good reversibility is desirable in solid state storage to enable repeated absorption-desorption cycles without significant loss of storage capabilities. Good absorption/desorption kinetics are likewise desirable to enable hydrogen to be stored and released in a relatively short period of time. A useful solid state hydrogen storage material and system should also provide a control mechanism that can tightly control hydrogen desorption from the solid state and prevent excessive pressure build-up and possible explosions.

Many solid state hydrogen sorption materials are known as are methods for modifying the absorption/adsorption/desorption properties of such materials. For example, the pressure and temperature at which hydrogen sorption and desorption takes place in many hydrogen absorbing alloys can be modified by minor changes in the alloy composition.

In order to determine the value or usefulness of a hydrogen storage material, it is necessary to determine the sorption and desorption properties of the material, including the thermodynamics, kinetics, and cycle life. Methods and systems for examining solid state gas sorption materials exist, most of which measure the difference in pressure of a calibrated sample volume as the gas of interest (e.g., hydrogen) is absorbed, adsorbed, or desorbed from the material. Such approaches are used to create pressure-composition isotherm diagrams for the materials. The kinetics of the materials are generally determined by measuring the change in sample pressure with time for a fixed volume, and the cycle life is generally determined through repetition of the measurement protocols to quantify any difference in storage capacity and/or kinetics of the materials over time.

Unfortunately, a number of issues exist for traditional examination approaches. One major issue revolves around the fact that the methods require large numbers of repetitive operations over a very long period of time to obtain a single isotherm. Moreover, the data collection points of a single operation must be closely monitored and timed over the long time period of the protocol in order to obtain reliable data. Major issues also arise due to temperature variations in the system. Most systems are located within a laboratory in which temperature will fluctuate, which can affect the test results. Unfortunately, even if the testing sample is closely watched for temperature variation, temperature variations in the sample due to response lag time of the temperature control system can be unavoidable, and even slight temperature variation can affect the accuracy of the measured characteristics. Methods for addressing temperature variability have included submersion of the system in a thermally isolated environment, which is expensive and often not effective, as complete thermal isolation of the sample is generally not realistically possible.

What are needed in the art are methods and systems that can address these and other issues. Improved systems that can provide high quality sorption data for gases via a fast and automated protocol, with hydrogen being of particular significance, would be of benefit in the art.

SUMMARY

According to one embodiment, disclosed is a gas sorption apparatus that includes a sample holder, a gas inlet to and a gas outlet from the sample holder, a heating system, and a control system. More specifically, the heating system includes a magnetic induction heating coil, with the sample holder being locatable within a magnetic field of the magnetic induction heating coil. The control system is in communication with the gas inlet, the gas outlet, the sample holder, and the magnetic induction heating coil. The control system can be utilized to control the aliquot volume, and periodicity, of a gas sample fed to or removed from the sample holder through control of the gas inlet and the gas outlet. The control system can also control the temperature of a gas sample within the sample holder through control of the magnetic induction heating coil. Control of collection of data points including pressure, temperature, and time data, and the development of an absorption isotherm or a desorption isotherm from the collected data, among other parameters can also be provided by the control system.

Also disclosed are methods for determining the sorption characteristics of a material for a gaseous sample. For instance, a method can include introducing or removing an aliquot of a gaseous sample to/from a sample holder. For instance, the gaseous sample can include a hydrogen, which can include one or more isotopes of hydrogen. The sample holder can include the sorption material of interest, e.g., a metal or metal alloy that is capable of forming a hydride, and can also include a magnetic material. A method can also include controlling the temperature of the local environment including the gaseous sample and the sorption material within the sample holder by controlling an operational characteristic of a magnetic induction heating coil. The temperature control is provided by locating the magnetic material within a magnetic field of the magnetic induction heating coil and also in thermal communication with the sorption material of interest. A method can also include measuring the pressure within the sample holder multiple times over a period of time following the introduction or removal of the aliquot to/from the sample holder and thereby determining a first equilibrium pressure of the gaseous sample with the sorption material of interest. A method can be automated and the equilibrium pressure determination process can be carried out multiple times to obtain a pressure-composition isotherm. In some embodiments, a method can include examination of multiple sorption materials in parallel with one another or examination of a single sorption material under multiple different conditions in parallel with one another in order to simultaneously obtain multiple pressure-composition isotherms.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
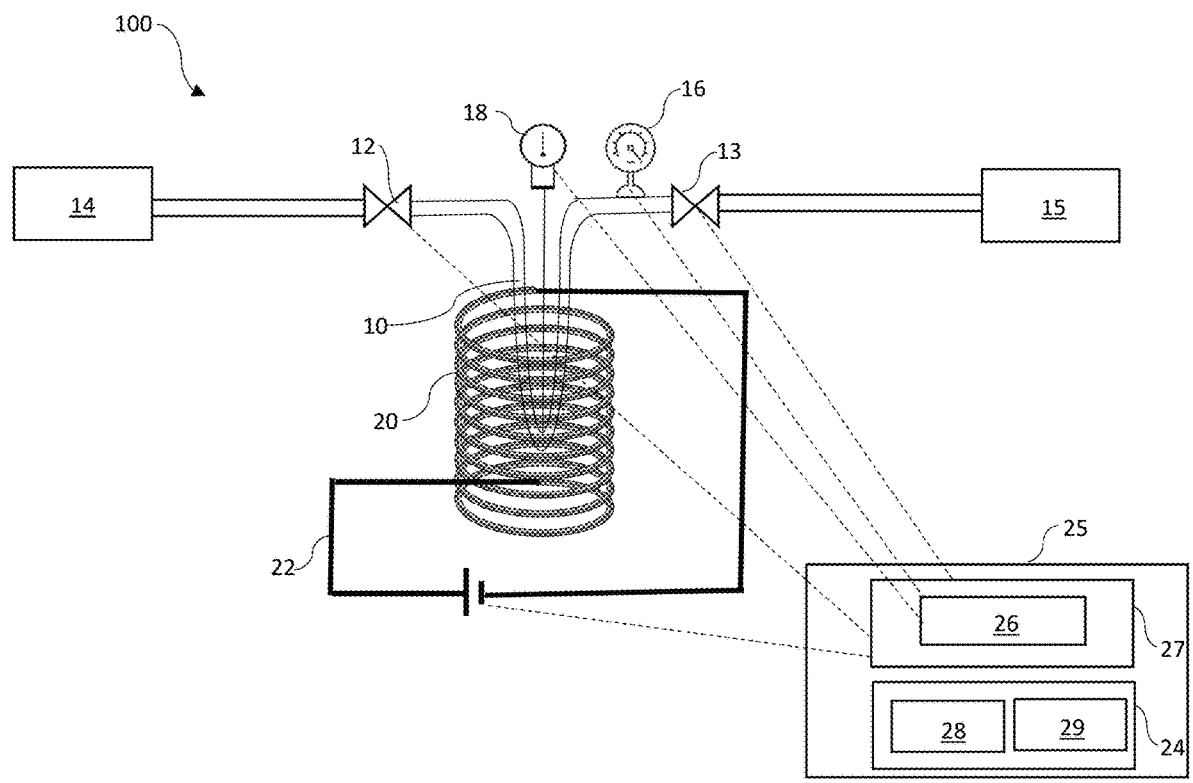
FIG. 1 schematically illustrates one embodiment of a system as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to automated apparatuses for use in examining gas sorption materials. During use of the devices, a noncontact magnetic induction heating approach can be utilized for controlling the temperature of the tested materials. The focused and controlled heating system can provide improved temperature control to the systems. As such, the systems can be used to generate isotherms on even small quantities of sorption materials, e.g., nanogram or microgram-scale quantities, and can do so automatically and unattended. Moreover, the systems can operate over a wide range of temperatures (e.g., from about −80° C. to about 1000° C.) and pressures (e.g., from 0 to about 2000 Torr) and can be programmed to collect data over hundreds or thousands of cycles that can be automatically controlled. Through use of disclosed apparatuses, high quality results can be obtained within a relatively short period of time, with complete isotherm collection possible over a period of a few hours, e.g., about 8 hours or less in some embodiments.

FIG. 1 schematically illustrates one embodiment of an apparatus 100. As illustrated, an apparatus can include a sample holder 10. The sample holder 10 can define an internal space that can be loaded with the sorption material of interest. The sample holder can also be placed in fluid communication with a gas source 14 via a valve 12 and with a gas sink 15 via a valve 13. Valves 12, 13 can be controlled to periodically isolate the contents of the sample holder 10 during the determination of equilibrium pressures for a sorption material during a testing protocol.

While illustrated as having a U-shape in FIG. 1, a sample holder 10 is not limited to any particular shape or size. In one embodiment, the sample holder 10 can define a relatively small internal space; for instance, a cross-sectional dimension of from about 10 µm to about 1000 µm, and/or an internal volume of from about 0.5 mL to about 10 mL, which may be preferred for use in determining the sorption characteristics of a small amount of a sorption material, e.g., on the order of nanograms or micrograms of materials. In some embodiments, an apparatus can include multiple sample holders of various different sizes, with a preferred sample holder volume selected for a particular testing protocol depending upon the specific parameters of the testing protocol (e.g., sample size). In some embodiments, a system can be designed to incorporate multiple sample holders at one time. For instance, a single gas source 14 can be placed in fluid communication with multiple sample holders (one embodiment of which is further described in the Examples section below). Alternatively, different sample holders can be placed in fluid communication with different gas sources.

The apparatus 100 also includes a non-contact heating system. More specifically, the heating system utilizes magnetic induction non-contact heating and includes a heating coil 20 in an electric circuit 22. As indicated, the heating coil 20 can be placed in relation to the sample holder 10 such that a magnetic material of the sample holder 10, which can either be removably located within the sample holder 10 or a permanent component of the sample holder 10, can be placed within a magnetic field of the heating coil 20. For instance, as indicated in FIG. 1 the sample holder 10 can be located within the heating coil 20 in some embodiments and thus within the magnetic field of the coil when power is supplied to the circuit 22. In other embodiments, the sample holder 10 need not be located within the volume defined by the coil 20, but can instead be located near the heating coil 20, as long as the magnetic field strength at the location of the sample holder 10 is strong enough to induce heating of the magnetic material of the sample holder 10.

During use, AC power can be supplied to the circuit 22, causing formation of an oscillating magnetic field around the heating coil 20. In the presence of an oscillating magnetic field, the magnetic material of the sample holder 10 can act as a local "hot-spot" to heat up the surrounding environment via hysteresis loss or relaxation mechanisms. This occurs because the magnetic moment of the material repeatedly changes direction to line up with the oscillating external field, which can cause local heating. This change of direction can take place via Neel relaxation, by which the magnetic moment rotates in the fixed lattice of the magnetic material. In some embodiments, the magnetic material of the sample holder can be in the form of magnetic nanoparticles located within the sample container 10. In this embodiment, the change of direction of the magnetic moment of the material can also cause Brownian relaxation, by which the nanoparticles physically rotate so the moment lines up with the external field.

Induced heating of a magnetic material of the sample holder 10 can heat a sorbent material of interest that has been loaded into the sample holder 10, as well as the gaseous sample retained within the sample holder 10 to maintain the isothermal characteristics of the system during a testing protocol. The magnetic induction heating system of an apparatus can provide a range of benefits. For instance, heating of the sorption material of interest, and related equilibrium pressure of the sample gas with the sorption material, can be achieved rapidly, while the surrounding area external to the sample holder 10 is not subjected to higher temperatures. Moreover, as the heating source is local and narrowly targeted to the sample holder 10, temperature variation in the surrounding area, e.g., within a lab or glove box, will not have the potential to affect the temperature of the materials retained in the sample holder 10 as in previously known devices. Moreover, thermal energy delivered to the sorption material can be rapidly modulated by suitable selection of alternating/oscillating electromagnetic field properties such as the amplitude and frequency of the alternating magnetic field and the shape of the magnetization curve.

The noncontact magnetic induction heating system can be highly efficient, as the system can promote fast sorption kinetics and efficient "on demand" temperature control. Efficiency can also be gained as the energy input to a system can be selective, localized, and targeted, which can encourage rapid heating and cooling of the materials retained in the sample holder (for instance, about 50° C./sec in some embodiments) while the surrounding area need not be subjected to excessive wasted heat, thereby minimizing temperature effect of the surroundings and preventing temperature drift of a system during isothermal data collection.

Referring again to FIG. 1, in addition to the magnetic induction heating system, an apparatus 100 can also include a control system 25 that can include, without limitation, a communications module 27 and related sensor interface 26, as well as data analysis/storage 24 and related memory 29 and processors 28. As indicated, a control system 25 can be in communication with the electric circuit 22 of the magnetic induction heating system and the valves 12, 13 of the apparatus 100, as well as with data collection devices including, without limitation, a pressure sensor 16 that can provide pressure data within the sample holder 10 and a temperature sensor 18 that can provide temperature data within the sample holder 10.

The control system 25 can be utilized to control components of an apparatus during data collection. In addition, in some embodiments, the control system 25 can be utilized in data analysis to provide useful output information, such as a pressure-composition isotherm diagrams of a sorption material of interest.

The control system 25 can include a communications module 27 to facilitate communications between the control system 25 and one or more of the other components of the system 100. For instance, the communications module 27 may allow for the control system 25 to transmit control signals to each valve 12, 13 for controlling its operation. The communications module 27 may include a sensor interface 26 (e.g., one or more analog-to-digital converters) to permit the signals transmitted by one or more sensors 16, 18 to be converted into signals that can be understood and processed by the processors 28 of the control system 25. For example, as shown in FIG. 1 the sensor interface 26 may be communicatively coupled to one or more temperature sensors 18 configured to monitor the internal temperature within the sample holder 10 and/or one or more pressure sensors 16 configured to monitor the internal pressure within the sample holder 10.

A data analysis/storage unit 24 can include one or more processors 28 and a memory 29. The processor(s) 28 can include any suitable processing device, such as a microprocessor, microcontroller, integrated circuit, or other suitable processing device, including a combination of discrete analog and/or digital logic circuitry (such as switches, amplifiers, integrators, comparators, flip-flops, AND gates, and the like) to perform control functionality. The memory 29 can include any suitable computing system or media, including, but not limited to, non-transitory computer-readable media, RAM, ROM, hard drives, flash drives, or other memory devices. The memory 29 can store information accessible by processor(s) 28, including instructions that can be executed by processor(s) 28. The instructions can be any set of instructions that when executed by the processor(s) 28, cause the processor(s) 28 to provide desired functionality. For example, instructions can include instructions for determining existence of an equilibrium pressure at constant temperature within the sample holder 10, instruction for feeding/removing single aliquots of a gaseous sample to/from the sample holder 10, instructions for maintaining a temperature within the sample holder, and instructions for starting/ending a testing protocol.

Memory 29 can also be used to store data. Data can be any form of data, including reference data for use in a testing protocol as well as data collected during a protocol that can be stored for later transmission, analysis, or utilization.

The control system 25 may be configured to continuously or periodically monitor the internal pressure within the sample holder 10 via one or more pressure sensors 16 to determine when equilibrium pressure has been achieved as well as when to open the appropriate the valve 12, 13 for allowing entry or exit of a predefined aliquot of the gas sample from the sample holder 10.

For example, signals from a pressure sensor 16 can be applied to amplifier channels and integrated and applied to an integrator circuit of the sensor interface 26 of the control system 25. The data received at the sensor interface 26 can be analyzed via processor(s) 28, which can include a timing circuit that can include an encoder clock signal which has defined period that can be utilized in determination of pressure equilibrium. For instance, equilibration state can be an input parameter to the control system and can be defined as being achieved once pressure fluctuation within the sample holder 10 is about 1 Torr or less, about 0.1 Torr or less, or about 0.01 Torr over a period of about 5 seconds or more, about 10 seconds or more, or about 30 seconds or more in some embodiments, for instance from about 5 seconds to about 5 minutes, or from about 30 seconds to about 1 minute in some embodiments. Thus, control system 25 can determine achievement of equilibrium pressure in the sample holder 10 at which point instruction stored within the memory 29 can instruct the communications module 27 to open the appropriate valve 12, 13, and instigate the next step in a testing protocol, i.e., addition or removal of an aliquot of a gaseous sample to/from the sample holder 10.

The control system 25 can also monitor the internal pressure within the sample holder 10 via the sensor 16 to determine when a single aliquot of a gaseous sample has entered or exited the sample holder 10 and thus when to close the appropriate valve prior to determination of the next equilibrium pressure in a testing protocol. For instance, input data to the memory 29 can include aliquot size by pressure change in the sample holder. Beneficially, disclosed systems allow for wide variation in the defined value for a pressure change increment of a single aliquot and thus wide variability in design of a testing protocol. In one embodiment, a single aliquot can be determined by pressure change in the sample holder of about 50 Torr, but wide variation is possible in this parameter. For instance, a pressure change increment for a single aliquot of a gaseous sample can vary from about 5 Torr to about 50 Torr in some embodiments. Of course, smaller loading volumes could allow from smaller increments and likewise, larger loading volumes could allow for larger increments. Upon determination by the control system 25 that a single aliquot has been fed to or removed from the sample holder 10, instructions stored within the memory 29 can instruct the communications module 27 to close the appropriate valve and instigate the next step in a testing protocol, i.e., determination of equilibrium pressure in the sample holder at the new conditions.

Instructions provided in a memory 29 can be designed to accommodate variations across a protocol. For instance, as the equilibrium pressure will be continually increasing or decreasing during a single protocol, the metrics for determination of equilibrium pressure and/or the pressure change at addition/extraction of a single aliquot can be varied across a single protocol. By way of example, at extremely low pressures, it may be expected for a system to take a longer period of time to arrive at equilibrium pressure, while at high pressures, equilibrium can be expected to be achieved more rapidly. Similarly, in some embodiments, it may prove beneficial to modify the defined pressure change in the sample holder that is associated with an individual aliquot that enters/exits the sample holder throughout the course of a single testing protocol. The input parameters to the memory 29 can be defined to reflect such variations throughout a protocol, which can improve efficiency of the data collection period as well as accuracy of the collected data.

The control system 25 may also be configured to continuously monitor the internal temperature within the sample holder 10 via the sensor 18 to determine if the contents of the sample holder 10 have drifted from the target temperature. For instance, during use, the sensor interface 26 may be configured to receive an indication that thermal drift has occurred in the sample holder 10 from a preset value and heating is needed (e.g., by receiving at sensor interface 26 a signal from a temperature sensor 18 associated with the sample holder 10). In such instance, the communications module 27 may be configured to transmit suitable control signals for controlling the operation of the electric circuit 22 and associated heating coil 20 to modify the energy delivery to the magnetic material and increase the temperature within the sample holder 10 as necessary.

It should be appreciated that although the control system 25 has been described as being communicatively coupled to the components associated with the embodiment of the apparatus 100 shown in FIG. 1, a control system 25 may generally be coupled to any components for automatically controlling operations of one or multiple sample holders each of which can be associated with multiple components. For instance, in the embodiment described below, a control system may be communicatively coupled to first and second input valves and first and second output valves for controlling gaseous flow in and out of first and second sample holders, respectively, that can in turn be coupled to the same or different gas sources, and/or can carry the same or different sorption and/or magnetic material for development of multiple pressure-composition isotherm diagrams simultaneously.

In addition to controlling the apparatus components during a testing protocol, a control system can in one embodiment also utilize memory 29 and processor(s) 28 to store and analyze collected data and develop output of a system, e.g., a process-composition isotherm diagram. Data collection can include continuous or periodic collection of pressure and temperature data over the course of a testing protocol. For instance, collection of equilibrium pressure values over the course of a testing protocol can be collected and stored for output or further analysis or use.

Of course, as previously stated, multiple different units can be utilized in various aspects of disclosed methods. For instance, a first unit can include a communications module 27 with necessary input/output, memory, and processor(s) for data collection, while a second unit can include a data analysis module with necessary input/output, memory, and processor(s) for analyzing data (e.g., temperature, pressure and time data).

As discussed, the noncontact magnetic induction heating system of an apparatus 100 utilizes a magnetic material within a sample container 10 for temperature control during an analysis protocol. In one embodiment, selection of the magnetic material can be used to control the thermal characteristics of an apparatus. For instance, one or more of the type, size, shape, Curie temperature, and crystallinity of a magnetic material can be used to control the thermal characteristics of the material during use and thus can be used to control the thermal characteristics of the sorption material of interest and the overall testing protocol.

Further system control can be obtained through placement of the magnetic material with respect to the heating coil 20 and the sorption material of interest. For instance, in some embodiments, composite nanoparticles that include both a magnetic component and a sorption component can be loaded into a sample holder 10 and the composite nanoparticles can be selectively placed in regions of the magnetic field where energy input and thus heating effects are controlled, e.g., at maximum, minimum, or other known field strength. In other embodiments, the magnetic material and the sorption material of interest can be separate particles, and can be placed adjacent/near one another in a defined fashion so as to tightly control the thermal communication between the magnetic material, the sorption material, and the gaseous sample within the sample holder 10.

The magnetic and sorption materials, whether composite or separated, can be provided in one embodiment as nanoscale or microscale materials. As utilized herein, the term "nanoparticles" is intended to refer to particles for which the largest average cross sectional dimension of the particle may range from about 1 nanometer to about 1 micrometer, in some embodiments from about 1 nanometer to about 100 nanometers, and in some embodiments, from about 50 nanometers to about 500 nanometers. As utilized herein, the term "microparticles" is intended to refer to particles for which the largest average cross sectional dimension of the particle may range from about 1 micrometer to about 1 millimeter, in some embodiments from about 1 micrometer to about 100 micrometers, and in some embodiments, from about 50 micrometers to about 500 micrometers. The shape of a particle may also generally vary as desired. For example, in some embodiments, the particles may have the shape of a sphere, plate, rod, disc, bar, tube, an irregular shape, etc. In some embodiments, the shape and size of the particle, and in the case of composite particles, the relative location of the magnetic and sorption materials, can be utilized to control sorption characteristics.

Use of smaller particles can be beneficial, as this can promote fast gas/solid exchange by shortening diffusion distances. Bulk porous materials can exhibit a larger penetration depth of the storage reaction into the bulk (e.g., hydride formation), which can increase both the absorption and desorption times. In addition, smaller particles, e.g., nanoparticles, can exhibit increased kinetics of gas uptake and release as compared to bulk porous materials such as bulk polymicrocrystalline materials.

The magnetic material can absorb energy provided in a non-contact fashion and efficiently convert and re-emit at least a portion of that absorbed energy as thermal energy. The non-contact energy absorption and conversion capability of this material allows for heat generation of the system to be highly localized and better controlled as compared to more conventional approaches. Specifically, conventional heating occurs from the application of thermal energy to the outside of a testing apparatus and bulk transport of the thermal energy toward the contents held in a sample container, leading to an increase in temperature of the total internal environment and the surroundings. In localized thermal heating as in disclosed apparatuses, heating can be carried out with each magnetic particle acting as a single source of heat, controlled by the non-contact absorption of energy in a non-thermal form, and as such, the surrounding area can be minimally heated, as the non-thermal energy source will heat only the particles with limited heating of the surroundings. This leads to a smaller energy footprint for a system as well as much greater control of the heating.

In general, any magnetic material capable of absorbing energy in the presence of an alternating magnetic field and re-emitting at least a portion of that energy as heat is encompassed. For instance, a magnetic material can include, but is not limited to, rare earth metals such as gadolinium, terbium, dysprosium, holmium, etc.; transition metals such as iron, nickel, cobalt, magnesium, etc.; noble metals such as rhodium, palladium, etc. In one embodiment, the magnetic material can include at least one of iron, nickel, and cobalt. Examples of magnetic materials include those including Fe, Ni, Co, NiCo, FeZn, borides of these materials, ferrites, rare-earth metals, or alloy combinations thereof. The magnetic materials can be present in any suitable form including, without limitation in the form of oxides, compositions, combinations, solid dispersions, and alloys, such as $Gd_5Si_4$, $Gd_5Si_{2.06}Ge_{1.94}$, $Gd_7Pd_3$; $MnFeP_{0.35}As_{0.65}$ and MnAs.

In one particular embodiment, an iron-based magnetic material including $Fe^{2+}$ and/or $Fe^{3+}$ can be utilized in a suitable form including, but not limited to, compositions, complex oxides, alloys, solid dispersions and other combinations, for instance with elements of Group IV, including but not limited to lead, zirconium, titanium, tin, optionally doped by small amounts of the elements of the III and V groups, such as scandium and niobium.

Composite particles that include a sorption material of interest coupled to a magnetic material can be prepared using any of a variety of known technologies. For example, composite nanoparticles can be formed by the plasma method in inert medium (for example, under argon) from particles of a larger initial size, for example, 50-100 microns, by templated growth methodologies, by ionic deposition and growth methodologies, by chemical reduction, etc.

Magnetic particles can be formed with selective control of the input energy (the magnetic field strength or the wavelength of electromagnetic radiation) required to cause the particles to heat the local area. For instance, at least one of the size and shape of the particles as well as the particulars of the magnetic material incorporated in the particles may be configured to particular design specification.

Disclosed apparatuses can be utilized to examine the sorption characteristics of any gaseous sample material of interest. However, in one particular embodiment, disclosed apparatuses can be used to examine the sorption characteristics of a hydrogen absorbing material that can absorb and release hydrogen according to a thermal control mechanism. In one embodiment, an apparatus can be used to examine the hydrogen absorbing characteristics of a material that is capable of forming a metal bond with hydrogen according to an interstitial hydride formation methodology.

By way of example, a hydrogen absorbing material can be a crystalline or amorphous material formed of any metal or metal alloy capable of reversibly storing hydrogen within the matrix. Known reversible hydrogen absorbing materials as may be examined by an apparatus can include, without limitation, an element chosen from Group IA alkali metals, Group IIA alkali earth metals, Group IIIB lanthanides, or Group IVB transition metals. In one embodiment, the hydrogen absorbing material can include a transition metal capable of forming a reversible binary metal hydride including, without limitation, palladium, titanium, zirconium, hafnium, zinc, and/or vanadium.

An apparatus can be utilized to examine the sorption characteristics of multi-component metal alloys such as, and without limitation to, combinations of Group IV elements with Group V through Group XI elements (based on the 1990 IUPAC system, in which the columns are assigned the numbers 1 to 18), as well as alloys including combinations of lanthanides (atomic numbers 58 to 71) with Group VII through Group XI elements. For example, the hydrogen absorbing material can have the structure $A_xT_y$, in which A can be one or more Group IV elements and T can be one or more Group V through Group XI elements. In some embodiments, a Group VI metal can be selected from Mo and W, and a Group VIII metal can be selected from Fe, Co, Ni, Pd, and Pt. In some embodiments, a Group VI metal can be Mo and a Group VIII metal can be selected from Co and Ni.

In another embodiment, an apparatus can be utilized to examine the characteristics of a hydrogen absorbing material having a compositional formula of

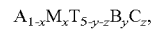

$$A_{1-x}M_xT_{5-y-z}B_yC_z,$$

wherein:
A=is an alloy of rare earth elements, typically including cerium and lanthanum;
M=La, Pr, Nd or Ce;
T=Ni;
B=Co;
C=Mn, Al or Cr;
x=0.0 to 1.0;
y=0.0 to 2.5; and
z=0.0 to 1.0.

The sorption material can be examined in one embodiment to determine the pressure and/or temperature at which it can most efficiently absorb and/or desorb hydrogen. In one embodiment, the sorption material can be examined to determine the pressure and/or temperature at which it can most efficiently absorb and/or desorb an isotope of interest, for instance as may be utilized in separation of hydrogen isotopes from one another.

In one embodiment, a testing protocol can include modification of a starting sorption material followed by further testing so as to fine-tune desirable characteristics of the material by an appropriate alloying method and as such, to design a particular sorption material for use in a particular process.

The magnetic and sorption materials can be in direct or indirect contact with one another and combined in any morphology or fashion so as to maintain the thermal communication. For instance, in one embodiment, composite materials can be provided as core/shell composite nanoparticles in which the shell material either partially or completely covers the core material. The particular arrangement of the materials is not critical, as long as each is capable of carrying out the desired function. For instance, the core of a core/shell composite nanoparticle can be formed of either a sorption material of interest or a magnetic material, as long as each component can carry out the desired function (e.g., hydrogen can reach and be absorbed by a hydrogen absorbing material).

In one embodiment, a magnetic particle can be first formed and the sorption material of interest can be deposited on all or on a portion of the surface of the magnetic particles, for instance via a wet chemistry formation process. In another embodiment, composite particles can be formed of an alloy that includes both a magnetic component and a sorption component. Depending upon the composition and morphology of the particular materials included in a composite particles, the heating characteristics of the magnetic material may or may not vary with the presence or amount of the sorption material. For instance, the heating characteristics of a magnetic particle may be independent of the presence of a metallic domain that functions as a hydrogen absorbing material.

The present disclosure may be better understood with reference to the Examples set forth below.

EXAMPLE

Figure 2:
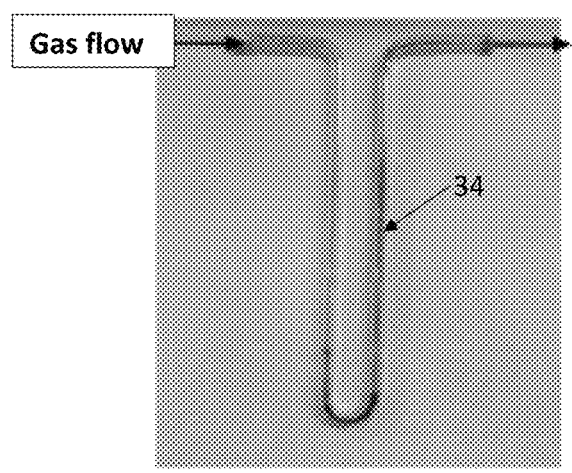
FIG. 2 illustrates one embodiment of a sample holder of a system as described herein.
Figure 3:
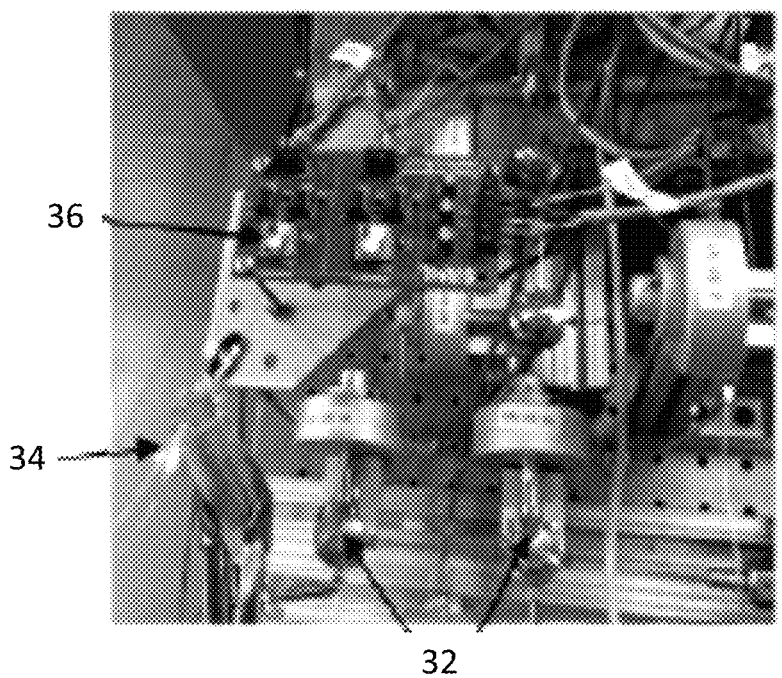
FIG. 3 illustrates a portion of a system utilized in the Examples section herein.

An automated gas absorption-desorption apparatus, as schematically illustrated in FIG. 1, was used to measure the gas absorption-desorption behavior of small quantities of hydride material at low pressures (0 to 1200 Torr). A portion of the apparatus is illustrated in FIG. 3 including automated valves 32 that were remotely controlled using LabVIEW. Volume calibrations of the apparatus were performed using helium (He) in a calibrated volume (26 cc). The apparatus could process two samples concurrently for determination of equilibrium temperatures, pressures, and thermodynamics. U-shaped sample tubes 34, one example of which is illustrated in FIG. 2, were connected to the apparatus using 0.05 mm capillary tubes connected to the automated valve on the apparatus. Paroscientific pressure transducers 36 were connected to the inlet side of the capillaries. The sample tubes 34 were equipped with NovaSensor PTs to measure the gas on the outlet of the capillary. The NovaSensor PTs were connected to an in-house fabricated circuit board to amplify the signal from the transducers for data acquisition. This apparatus was capable of collecting data on multiple absorption-desorption cycling experiments to study long-term cycling effects on capacity and kinetics.

Isotherm measurements (hydrogen, deuterium, He and/or mixtures) were performed using this apparatus at various temperatures and pressures. The hydride material loaded in the sample tubes 34 was a lanthanum-nickel-aluminum (LANA) material that can exhibit response to a magnetic field depending upon the specific composition of the alloy. The 'as is' LANA material was received from a supplier and found to be non-homogeneous. The non-homogeneous 'as-is' LANA material was separated to provide 'magnetic LANA' and 'nonmagnetic LANA'. Magnetic LANA was responsive to a magnetic field and was separated from as-is LANA by use of a magnet and nonmagnetic LANA was not responsive to a magnetic field and, generally, was the remaining material following separation of magnetic LANA from the as-is LANA.

Magnetic and nonmagnetic LANA were further examined to determine relative amounts of lanthanum, nickel, and aluminum. Results are provided in Table 1, below.

TABLE 1

| Sample | mol % La | mol % Ni | mol % Al |
| --- | --- | --- | --- |
| Magnetic | 11.8 ± 0.7 | 47.4 ± 3.0 | 40.8 ± 10.1 |
| Nonmagnetic | 8.4 ± 1.1 | 35.6 ± 5.6 | 56.1 ± 17.7 |

Figure 4:
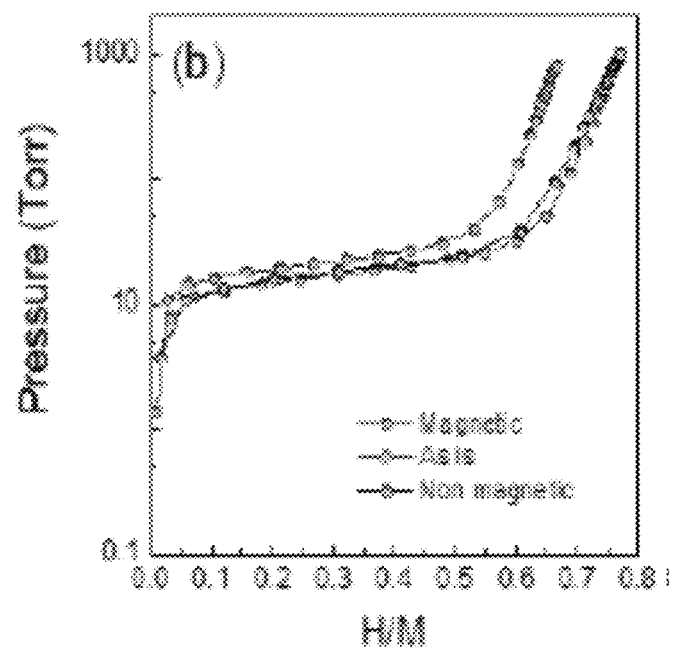
FIG. 4 presents hydrogen isotherms obtained by use of a system as described herein and comparative systems.

Sequential aliquots (1.7 mL calculated from He calibrations) of hydrogen or deuterium at 50 Torr increments were delivered to evacuated sample holders at room temperature (22° C.) and the pressure was allowed to equilibrate for 60 minutes; equilibration was achieved once the pressure fluctuation was less than 0.01±Torr. The aliquots were delivered to the sample holders until a final pressure of 1000 Torr was reached. For each aliquot, the equilibrium pressure was plotted against the calculated atomic hydrogen or deuterium to metal ratio (Q/M, where Q is any hydrogen isotope) to obtain pressure composition isotherms. On average, a full absorption isotherm was obtained within 8 hours using the automatic setup. The isotherms were reproducible for the same sample. Tens of isotherms were collected. FIG. 4 presents representative hydrogen isotherms obtained from the system of magnetic, nonmagnetic, and as-is LANA at 22° C.

A 10.0 KW magnetic induction system designed to operate between 250-450 kHz and equipped with a 425 kHz resonance frequency water-cooled copper coil (6 turns, 17.5 mm radius and 47.5 mm height) was purchased from MSI Automation, Inc. Magnetic field densities of 10-60 Wm could be generated depending upon the power setting as well as the size and shape of the heating coil. A Neoptix fiber optic temperature probe was used to monitor the temperature change. To perform the magnetic cycling experiments, sample holders containing either as-is LANA, magnetic LANA or nonmagnetic LANA were evacuated overnight before being loaded with various gas compositions of $H_2$, $D_2$, or He. Hydrogen aliquots (1.7 mL, 600 Torr) were introduced at room temperature (22° C.) to load the sample holders to the desired Q/M value. For magnetic cycling experiments, a Q/M value of 0.15 was maintained as it is safely on the plateau region of the LANA isotherm, which minimizes the effects of pressure increase from thermal effects rather than desorption effects. The loaded sample holders were allowed to reach equilibrium for 30-60 minutes (equilibrium was typically achieved within 5 minutes). The sample holders were placed in a dewar with crushed dry ice and cooled until an equilibrium pressure was achieved. The dewar was placed in the middle of the coil and magnetic heating was performed for 2 minutes at a specified power. The loaded sample holders were allowed to equilibrate to the starting pressure between each heating cycle. The magnetic induction experiments were performed in an oscillating magnetic field at different magnetic field strengths.

Figure 5:
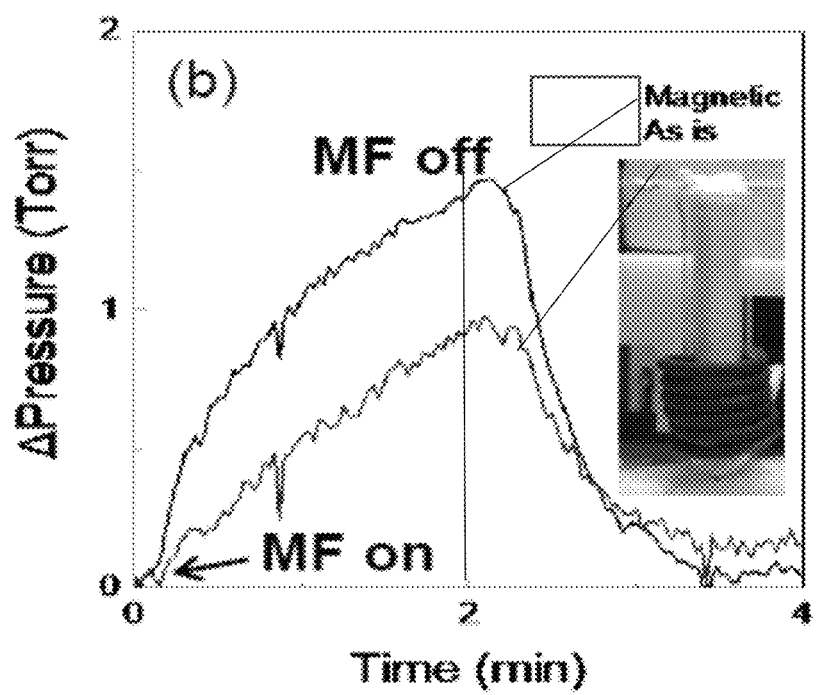
FIG. 5 compares the change in pressure with time during magnetic induction heating of a composite magnetic hydrogen storage material with a mixture of magnetic and nonmagnetic hydrogen storage materials.
Figure 6:
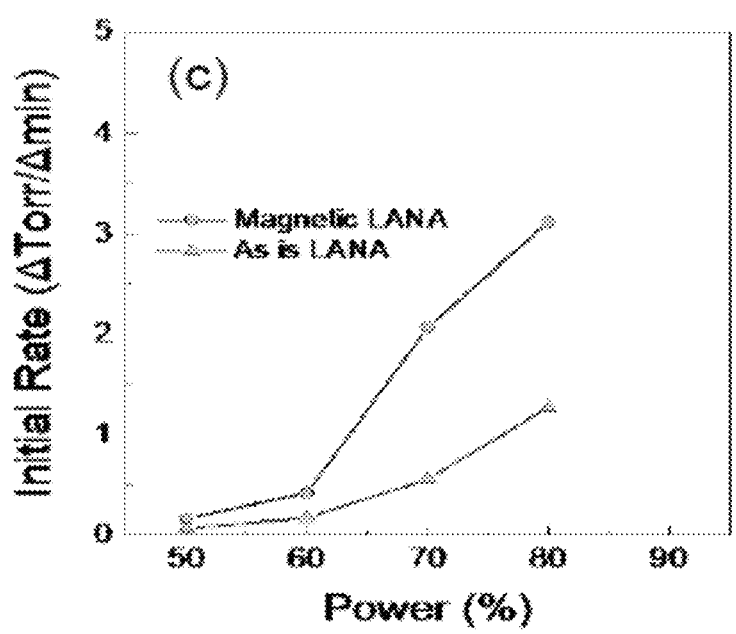
FIG. 6 compares the rate of pressure increase in a helium atmosphere of a composite magnetic hydrogen storage material with a mixture or magnetic and nonmagnetic hydrogen storage materials during the initial stages of a magnetic induction heating process.

FIG. 5 presents the results of magnetic induction heating (2 minutes) of as-is LANA and magnetic LANA in He atmosphere cooled with dry ice. The inset image of FIG. 5 illustrates the sample holder on dry ice within the magnetic coil. FIG. 6 presents the initial rate of pressure increase in a He atmosphere for as-is LANA and magnetic LANA as power of the magnetic heating coil increased.

While certain embodiments of the disclosed subject matter have been described using specific terms, such description is for illustrative purposes only, and it is to be understood that changes and variations may be made without departing from the spirit or scope of the subject matter.

What is claimed is:

1. A gas sorption apparatus comprising:
   a first sample holder;
   a gas inlet to the first sample holder, the gas inlet comprising a first valve;
   a gas outlet from the first sample holder, the gas outlet comprising a second valve;
   a heating system comprising a magnetic induction heating coil, where the first sample holder is locatable within a magnetic field of the magnetic induction heating coil; and
   a control system in communication with the first valve, the second valve, the first sample holder, and the magnetic induction heating coil, the control system being configured to selectively control operation of the first valve to allow a controlled amount of a gaseous sample to be fed to the first sample holder, the control system being configured to selectively control operation of the second valve to allow a controlled amount of the gaseous sample to be removed from the first sample holder, the control system being configured to selectively control current flow through the magnetic induction heating coil to control the temperature of a gas sample within the first sample holder.

2. The gas sorption apparatus of claim 1, wherein the first sample holder defines an internal volume of from about 0.5 milliliters to about 10 milliliters.

3. The gas sorption apparatus of claim 1, wherein the first sample holder defines a U shape.

4. The gas sorption apparatus of claim 1, further comprising a second sample holder in communication with the control system, the second sample holder being locatable within the magnetic field of the magnetic induction heating coil simultaneously with the first sample holder.

5. The gas sorption apparatus of claim 1, further comprising a temperature sensor associated with the first sample holder, the control system being configured to selectively control current flow through the magnetic induction heating coil based on measurement signals received from the temperature sensor to adjust the temperature of a gas sample within the first sample holder.

6. The gas sorption apparatus of claim 1, further comprising a pressure sensor associated with the first sample holder, the control system being configured to selectively control operation of the first and second valves based on measurement signals received from the pressure sensor.

7. The gas sorption apparatus of claim 1, further comprising a temperature sensor and a pressure sensor, the control system being configured to collect data continuously or periodically from the temperature sensor and the pressure sensor.

8. The gas sorption apparatus of claim 7, the control system being configured to analyze the collected data and provide a pressure-composition isotherm diagram.

9. The gas sorption apparatus of claim 1, the control system being configured to modify the controlled operation of the first and/or second valve and thereby modify the controlled amount of a gaseous sample to be fed to or removed from the first sample holder.

10. A method for examining sorption characteristics of a gaseous sample comprising:
    introducing or removing a first aliquot of a gaseous sample to/from a sample holder, the sample holder comprising a sorption material and a magnetic material;
    controlling the temperature of the gaseous sample and the sorption material within the sample holder by controlled use of a magnetic induction heating coil, wherein the magnetic material is within a magnetic field of the magnetic induction heating coil and wherein the magnetic material is in thermal communication with the sorption material;
    measuring a change in pressure within the sample holder following the introduction or removal of the first aliquot of the gaseous sample to/from the sample holder to determine a first equilibrium pressure of the gaseous sample with the sorption material;
    automatically repeating the introducing, controlling, and equilibrium pressure determination steps a plurality of times; and
    developing a first pressure-composition isotherm diagram from data collected during the repetitions.

11. The method of claim 10, wherein the step of introducing or removing the first aliquot of the gaseous sample to/from the sample holder comprises measuring a second change in pressure within the sample holder during the introduction or removal of the first aliquot.

12. The method of claim 11, wherein the second change in pressure is from about 5 Torr to about 50 Torr.

13. The method of claim 11, the method further comprising modifying the second change in pressure over the course of repeating the introducing, controlling, and equilibrium pressure determination steps a plurality of times.

14. The method of claim 10, wherein the magnetic material is in the form of particles.

15. The method of claim 10, wherein the particles comprise composite particles including the magnetic material and the sorption material.

16. The method of claim 10, wherein the sorption material comprises a hydrogen sorption material.

17. The method of claim 16, the hydrogen sorption material forming a metal hydride upon interaction of the sorption material with hydrogen.

18. The method of claim 16, wherein the sorption material preferentially adsorbs and/or desorbs a first hydrogen isotope over a second hydrogen isotope at a temperature and a pressure.

19. The method 10, further comprising:
    introducing or removing a second aliquot of a second gaseous sample to/from a second sample holder, the second sample holder comprising a second sorption material and a second magnetic material;
    controlling the temperature of the second gaseous sample and the second sorption material within the second sample holder by controlled use of the magnetic induction heating coil, wherein the second magnetic material is within the magnetic field of the magnetic induction heating coil and wherein the second magnetic material is in thermal communication with the second sorption material;
    measuring a change in pressure within the second sample holder following the introduction or removal of the second aliquot of the second gaseous sample to/from the second sample holder to determine a second equilibrium pressure of the second gaseous sample with the second sorption material;

automatically repeating the introducing, controlling, and equilibrium pressure determination steps involving the second sample holder a plurality of times; and developing a second pressure-composition isotherm diagram from data collected during the repetitions; wherein the first pressure-composition isotherm diagram and the second pressure-composition isotherm diagram are developed simultaneously.

20. The method of claim 10, wherein the repetition is continued until a pressure within the sample holder reaches about 2000 Torr.

* * * * *